US007193556B1

(12) United States Patent
Pereira et al.

(10) Patent No.: US 7,193,556 B1
(45) Date of Patent: Mar. 20, 2007

(54) SYSTEM AND METHOD FOR THE MEASUREMENT OF FULL RELATIVE POSITION AND ORIENTATION OF OBJECTS

(75) Inventors: Carlos M. Pereira, Tannersville, PA (US); Jahangir S. Rastegar, Stony Brook, NY (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 274 days.

(21) Appl. No.: 10/708,008

(22) Filed: Feb. 2, 2004

Related U.S. Application Data

(63) Continuation-in-part of application No. 10/065,023, filed on Sep. 11, 2002, now Pat. No. 6,724,341.

(51) Int. Cl.
*F42B 15/01* (2006.01)
*F41G 7/00* (2006.01)
*G01S 13/00* (2006.01)

(52) U.S. Cl. ............... 342/62; 342/61; 342/175; 342/188; 342/195; 244/3.1; 244/3.11; 244/3.14; 244/3.15; 244/3.19

(58) Field of Classification Search .......... 244/3.1–3.3; 342/59, 61–64, 118, 134–147, 175, 188–197, 342/450–465, 174–158, 352–367; 89/1.11, 89/6.5; 343/705–718, 772–786
See application file for complete search history.

(56) References Cited

U.S. PATENT DOCUMENTS 3,000,598 A * 9/1961 Bush .................. 244/3.13
3,137,853 A * 6/1964 Cutler ................. 342/355
4,072,281 A * 2/1978 Miller et al. ............ 244/3.16
4,641,801 A * 2/1987 Lynch et al. ............ 244/3.14
4,750,689 A * 6/1988 Yf ......................... 244/3.14
5,099,246 A * 3/1992 Skagerlund ............. 342/361
5,233,901 A * 8/1993 Nilsson et al. ............ 89/6.5
5,258,764 A * 11/1993 Malinowski ............ 342/359
5,414,430 A * 5/1995 Hansen ................. 342/188
6,016,990 A * 1/2000 Small ................... 244/3.11
6,407,702 B1 * 6/2002 Bergman et al. ......... 342/364
6,450,442 B1 * 9/2002 Schneider et al. ....... 244/3.14
6,572,052 B1 * 6/2003 Hansen ................. 244/3.11
6,724,341 B1 * 4/2004 Pereira et al. ........... 342/62

* cited by examiner

Primary Examiner—Bernarr E. Gregory
(74) Attorney, Agent, or Firm—John F. Moran

(57) ABSTRACT

A system for measuring a position and orientation of an object in flight relative to a reference coordinate system is provided. The system including: three or more illuminating sources, each disposed in a predefined position, the three or more illuminating sources together emitting a plurality of distinct polarized radio frequency signals to provide temporally synchronized, pulsed radio frequency signals that illuminate the object; one or more waveguide cavities disposed on the object for receiving the plurality of distinct polarized radio frequency signals from each of the three or more illuminating sources in flight; and a processor for measuring a time for the plurality of distinct polarized radio frequency signals to propagate from each of the three or more illuminating sources to the one or more waveguide cavities and the level of signal received at the waveguide cavities and to determine a position of the object relative to the three or more illuminating sources based on the measured times and the orientation of the object relative to the reference coordinate system based on the measure levels of received signals.

18 Claims, 10 Drawing Sheets

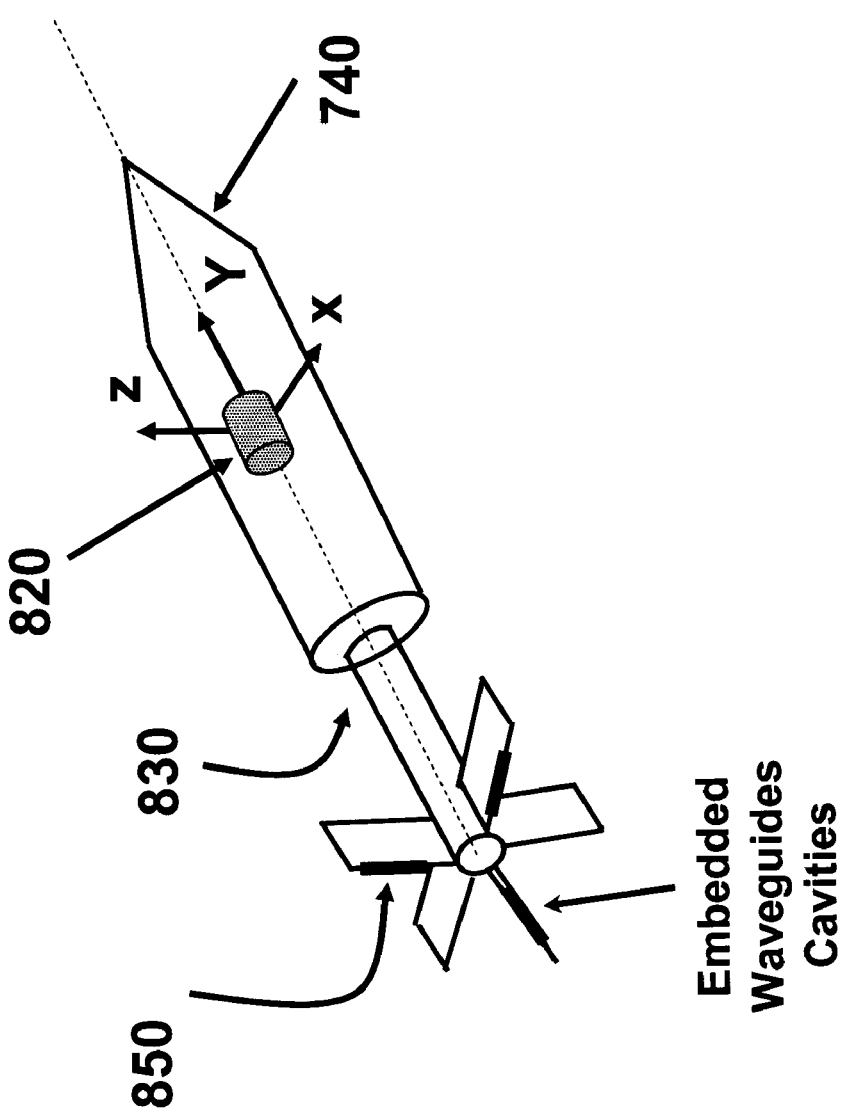
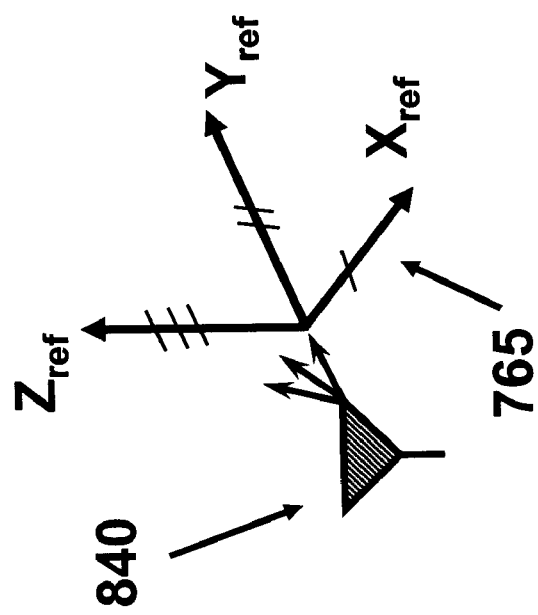
FIG 8

SYSTEM AND METHOD FOR THE MEASUREMENT OF FULL RELATIVE POSITION AND ORIENTATION OF OBJECTS

CROSS REFERENCE TO RELATED APPLICATIONS

The present application is a continuation-in-part of U.S. patent application, titled "Autonomous Onboard Absolute Position And Orientation Referencing System," Ser. No. 10/065,023, filed on Sep. 11, 2002 now U.S. Pat. No. 6,724,341, which is incorporated herein by reference.

FEDERAL RESEARCH STATEMENT

The invention described herein may be manufactured and used by or for the Government of the United States for governmental purposes without the payment of any royalties thereon.

BACKGROUND OF INVENTION

The present invention relates to systems (sensors) designed to measure full angular orientation and position of an object relative to another object. In munitions and other similar applications, such a system provides an absolute onboard referencing system, in which the munitions is provided by its full position and orientation information relative to one or more ground stations or other mobile platforms during the flight. In munitions applications, this full position and orientation referencing system offers advantages over other position and orientation measurement systems (sensors) for guidance and control of smart munitions. In munitions applications, other advantages of the present position and orientation measurement system include: (1) the capability of a smart munitions with such a sensing system to be capable of determining its position and orientation while in flight with respect to one or more ground stations or other moving platforms, (2) the capability of a munitions to have autonomous position and orientation system, and (3) the position and orientation sensing system will be minimally intrusive and consume relatively low power.

For a moving object such as a smart munition to be guided or its motion altered or controlled, the control system that provided guidance and control action must have real-time information about the position and orientation of the object. In general and depending on each specific application, the position and orientation may be those of the moving object relative to a ground station, or relative to another moving platform.

To meet the requirements of the U.S. Army's future needs in the areas of precision-guided direct- and indirect-fire munitions, it is important that the position and orientation sensors be capable of being integrated reliably and economically into small- and medium-caliber munitions as well as long-range munitions. In particular, it is desirable to embed such sensors in the munitions, and that the sensors be autonomous and provide onboard position and orientation information relative to a ground station or other moving platforms.

Currently, radar-based guidance, often augmented by Global Positioning System (GPS) data, is used to determine information related to the position of munitions. Radar-based guidance of munitions is based upon the use of radio frequency (RF) antennas printed or placed on the surface of munitions to reflect RF energy emanating from a ground-based radar system. The reflected energy is then used to track the munition or the stream of bullets on the way to the target. The surface printed or placed antennas are, however, not suitable for munitions applications since they cannot survive the firing environment and readily loose their accuracy. Such surface printed or placed antenna based sensors also require large amount of power for their operation, and are very sensitive to geometrical variations and tolerances.

Corrections to a munition's flight path are currently possible but only if the munitions are equipped with an additional suite of internal sensors such as Inertia Measurement Unit (IMU's), accelerometers, and gyroscopes. Global Positioning Signals (GPS) are also used alone or in combination with other sensors such as accelerometers and gyroscopes. However, the inertia based sensors are relatively complex and inaccurate, occupy a considerable amount of volume, consume a large amount of power, are prone to drift and settling problems, and are relatively costly. The GPS sensors cannot provide orientation information and are prone to the loss of signal along the path of travel.

Furthermore, the current IMU technology cannot be implemented for munitions that are subjected to extremely high acceleration rates during firing, such as medium and small caliber munitions. High performance munitions may be subjected to accelerations in excess of 100,000 Gs. In general, inertia based sensors have not been successfully developed to survive firing accelerations of 30,000 Gs and over and also be capable to have measurement sensitivity to measure low acceleration levels required for guidance and control purposes.

It is readily appreciated by those familiar with the present art that the issues and concerns that were described above for munitions are generally true for all mobile platforms.

A need therefore exists for position and orientation measurement systems (sensors) in general, and for those that could be mounted or embedded into various moving platforms for their guidance and control. In munitions applications in particular, the full position and orientation (pitch, yaw and roll) information will define the motion of munitions in-flight and allows it to be guided towards its target.

SUMMARY OF INVENTION

The development of an autonomous onboard absolute position and orientation measuring system (sensors) of the present invention fills this need by providing a means of determining the position and orientation of an object in flight with reference to a ground station or another mobile platform. It provides a means of efficaciously and economically embedding position and orientation measuring sensors for guidance and control purposes into the fins or body of projectiles and missiles such as supersonic, highly maneuverable small, medium-caliber and long range munitions. With such, generally embedded, position and orientation sensors, onboard munitions, it becomes possible to provide heretofore-unachievable accuracy from these munitions. It is an object of the present invention to provide a multiplicity of viable embodiments for achieving this accuracy.

In a first embodiment of the present invention, electromagnetic open waveguides embedded in a first object receive continuous or pulses of polarized RF energy in an appropriate frequency from at least one illumination source that is fixed to a second object. At any instant of time, the waveguides embedded in the first object may be in the line-of-sight of the illuminating source or may be out of line-of-sight of the illuminating source fixed to the second object. The objective of such a waveguide and illuminating source system is to measure the position and full orientation of the first object relative to the second object. From the magnitude and/or phase information received by the waveguides embedded in the first object, the position and full orientation of the first object relative to the second object can be determined, generally using a minimum of onboard electronics.

In a second embodiment, at least one linear accelerometer embedded in a first object is used to determine the position of the first object relative to a second object and waveguides embedded in the first object and one or more illuminators fixed to the second object are used to determine the orientation of the first object relative to the second object.

In yet another embodiment of the present invention for munitions the open waveguides are embedded in the fins or body of munitions. The waveguides equipped with internal RF antennas working in resonance, which may be referred to generally as slot waveguide antennas, provide onboard orientation information based on the magnitude of the received electromagnetic energy. The resonant apertures may take the form of mechanically tuned waveguides, such as sectoral horn waveguides, that are molded or machined into the fins or body of the object. This embodiment of the present invention presents numerous features. In particular, the position and orientation measuring system can be advantageously and economically integrated into the structure of a munition.

The illuminating polarized RF signal being transmitted from a fixed ground station or from any mobile platform towards the waveguide sensors need only be transmitted for very short periods of time to provide the necessary information for the waveguide sensors to operate. These resonant cavities may be thought of as special onboard RF antennas.

A principle of operation of the present position and orientation measurement system is based on the receiving characteristics of waveguide cavities fixed to the structure of the object to receive polarized radio frequency signals. In an embodiment of the present invention, the waveguides operate as resonance type antennas at or near the frequency of the illuminating electromagnetic field. The maximum signal is received when the waveguide is aligned with the transmitted polarized electromagnetic signal. At a given distance from the illuminating polarized RF source, the signal received by a waveguide is sensitive to its orientation relative to the illuminating source. This characteristic of the waveguide in the presence of a polarized illuminating source is the basis of the operation of the present position and orientation sensor and provides the orientation information. As the distance between the illuminating source and the waveguide is varied, the pattern of waveguide reception as a function of its orientation relative to the illuminating source does not change but its magnitude does. For a given orientation of the waveguide relative to the illuminating source, as the distance between the two increases, the strength of the signal received by the waveguide is reduced by a factor that is inversely proportional to the distance squared.

In an embodiment of the present invention, one or more position and orientation measuring waveguide are embedded in the object of interest. A multiplicity of polarized RF illuminators (sources) are then positioned at known positions relative to each other and provide temporally synchronized, continuous or pulsed polarized RF signals in known directions towards the intended object. The spatial position and full orientation of the intended object can then be determined from the signals received at the embedded waveguides as described below. With this embodiment of the present invention, no other position and/or orientation sensor information is required for the determination of the position and full orientation of the intended object relative to the illuminating sources. In general, a minimum of three waveguide sensors needs to be embedded into the intended object so that together with a minimum of three illuminators to provide onboard measurement of the full position and orientation of the object relative to the illuminators.

The position of the object relative to the illuminators can be determined by measuring the time taken for each signal to travel from each of the illuminators to the waveguides embedded in the object. Knowing the time taken for the signal to reach the waveguides embedded in the object, and since the speed of travel of electromagnetic waves is known (equal to the speed of light), it is possible to determine the distance traveled from each illuminator to the object.

This process provides distances (D1 through D3) for a three-illuminator set-up. Essentially distances D1 D3 are the radius of spheres, over which surfaces the object with embedded waveguides could be located. The three spheres intersect at two points, at one of which the object is located. The corrected position is selected considering the fact that the motion of the object has to be continuous and by knowing the position of the object a small enough amount of time earlier. The position of the object relative to the three illuminators is thereby determined. By measuring the position of the object at small enough intervals of time, the velocity of the object is also determined.

In this embodiment, three or more illuminators are considered to be used. A minimum of three illuminators is required though a greater number increases the accuracy of the onboard calculations. Similarly, by employing a greater number of waveguides on the object than the minimum required number, the accuracy of the measurements is increased.

In this embodiment, all illuminators in the system are temporally synchronized, with one illuminator designated as the master reference signal provider. The master signal provider triggers the other illuminators to send pulsed RF signals at a common, precise time. By choosing a different operating frequency for each illuminator, they can be uniquely identified by sensors onboard the moving object. The orientation of the moving object is also determined as previously described. As the result, the object will have an onboard system (sensor) to determine its position and full orientation relative to the illuminators that may be fixed or moving.

A method of determining distance is based on the measurement of the elapsed time for each of the signals from the illuminators to reach one waveguide embedded into the moving object. The time taken by the signals emitted from each of the illuminators to arrive at the moving object is proportional to the distance it has traveled. In particular, since electromagnetic waves travel at the speed of light, the distance traveled is the product of the time taken to reach the embedded sensor and the speed of light. Even though only one waveguide is required to determine the position of the moving object relative to the illuminators, by using more waveguides, the position of the moving object relative to the illuminators can be determined more accurately.

Another embodiment of the present invention relies on three independently oriented accelerometers, such as a tri-axial accelerometer, to determine the position of the moving object relative to a fixed or moving object, for example for determining the position of a munition in flight relative to a fixed or mobile ground station. A tri-axial accelerometer unit is a device comprised of three accelerometer devices mounted with their respective acceleration sensitive axes in orthogonal directions.

In yet another embodiment of the present invention, embedded waveguides illuminated by a single polarized RF source as previously described is used to measure angular orientation of the moving object relative to the illuminator, being fixed or mobile. The position of the moving object is then provided by the GPS.

BRIEF DESCRIPTION OF DRAWINGS

The above and other features of the present invention and the manner of attaining them, will become apparent, and the invention itself will be best understood, by reference to the following description and the accompanying drawings, wherein:

FIG. 8 is an illustration of an autonomous onboard absolute position and orientation measurement system (sensor) of the second embodiment of the present invention, illustrating an implementation that relies on at least one triaxial accelerometer to determine the position of a first object (in this case a munition in flight) by sensing accelerations in X, Y, Z directions of a Cartesian coordinate system fixed to the object relative to the fixed reference Cartesian coordinate system $X_{ref}Y_{ref}Z_{ref}$, wherein the signals from at least one e polarized radio frequency transmitter (illuminator) is received by waveguides embedded in the first object to determine the orientation of the object relative to the reference coordinate system $X_{ref}Y_{ref}Z_{ref}$, so that together, they provide a system (sensor) for the measurement of the position and orientation of the first object relative to the reference coordinate system $X_{ref}Y_{ref}Z_{ref}$;

Similar numerals refer to similar elements in the drawings. It should be understood that the sizes of the different components in the figures are not necessarily in exact proportion or to scale, and are shown for visual clarity and for the purpose of explanation.

DETAILED DESCRIPTION

Figure 1:
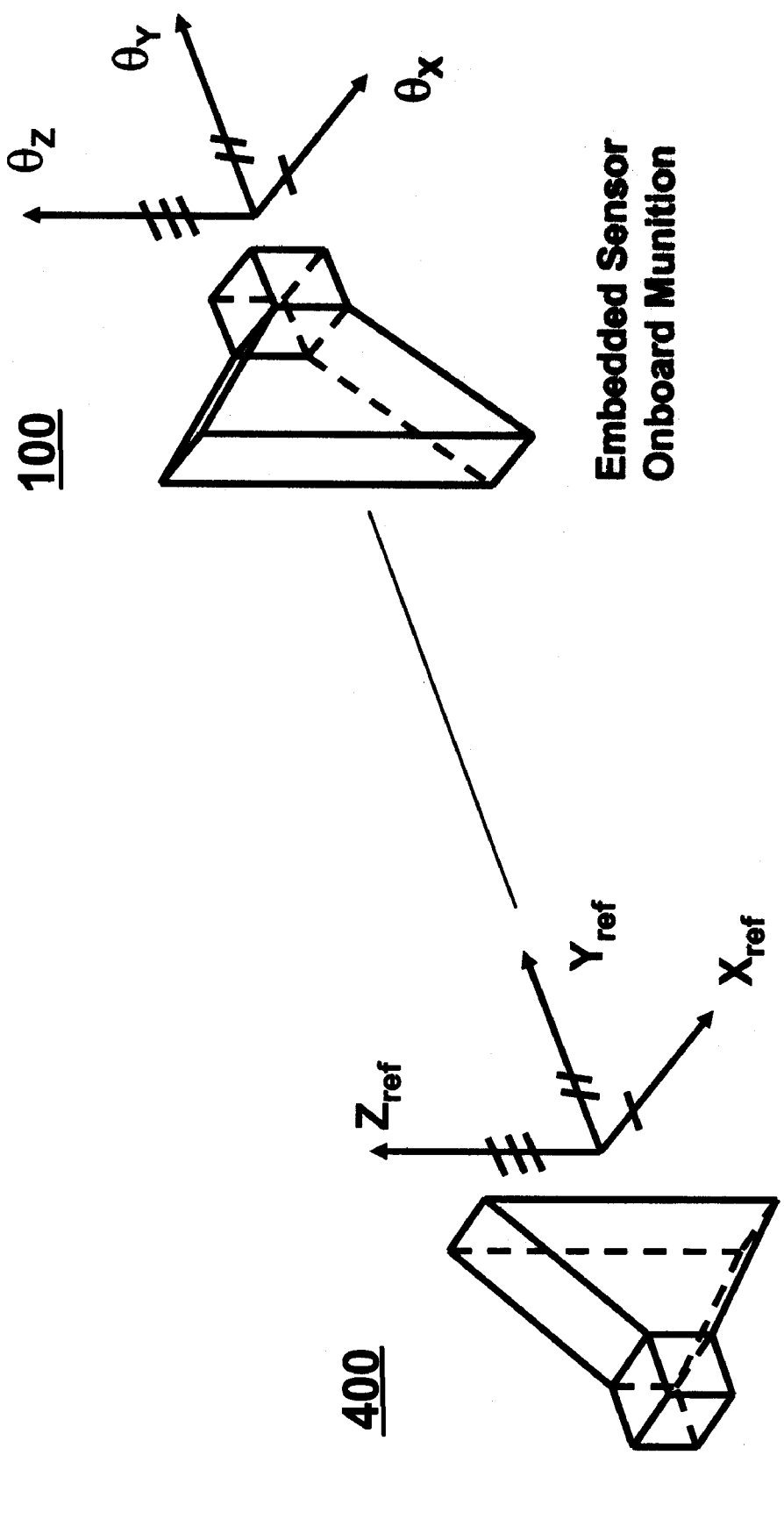
FIGS. 1 and 2 represent views of the embodiment of an autonomous onboard absolute position and orientation measurement system (sensor) for a munition application illustrating a preferred relative distribution of a plurality of embedded waveguide sensors in the fins of a munition for guidance and control.
Figure 2:
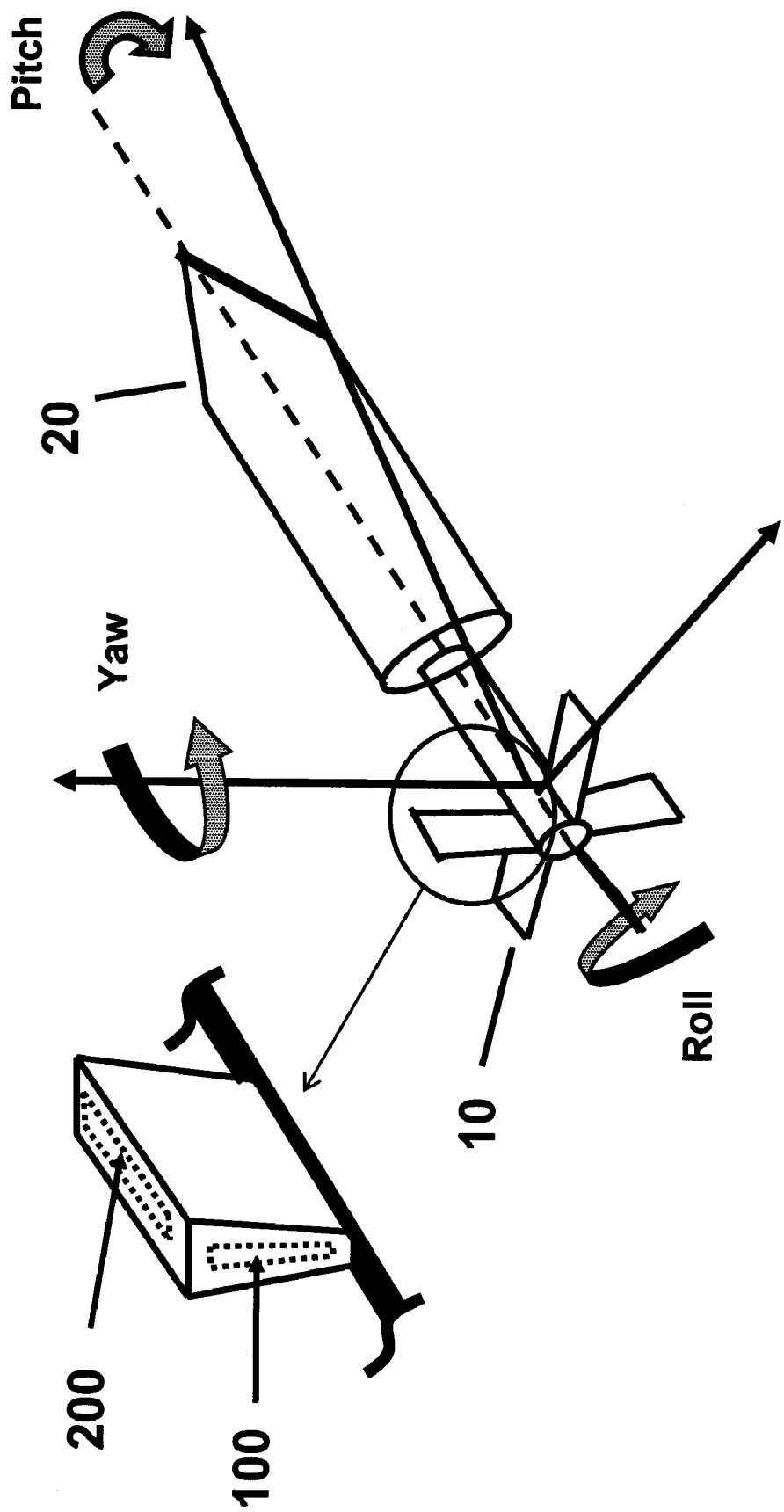

FIGS. 1 and 2 illustrate an autonomous onboard position and orientation measurement system (hereinafter also referred to as "position and orientation sensor") 10 for an object (in this case a munition) 20. The present invention has particular utility where the object is a munition for tracking such munition during flight. However, those skilled in the art will appreciate that the system and methods of the present invention are useful with other types of objects, for example for onboard measurement of the position and orientation of a mobile robotic platform relative to the ground (for a fixed illuminating source) or another mobile robotic platform (on which the illuminating source is affixed) for navigational purposes; for measurement of full position and orientation of a vehicle as being tested for suspension performance, and in general, in any system or device in which the position and orientation of the system or device is to be measured relative to a fixed (ground) or moving platform. In all such applications, the desired position and orientation are measured directly (for example, not by measuring accelerations) and the information is available onboard the system or device itself and can be made available to any other fixed or mobile station, including the ground or mobile station where the illuminating source is located. The position and orientation sensor 10 is comprised of one or more waveguide antennas (hereinafter also referred to as "waveguides") 100 and 200, some of which are shown for illustration purpose.

Figure 3:
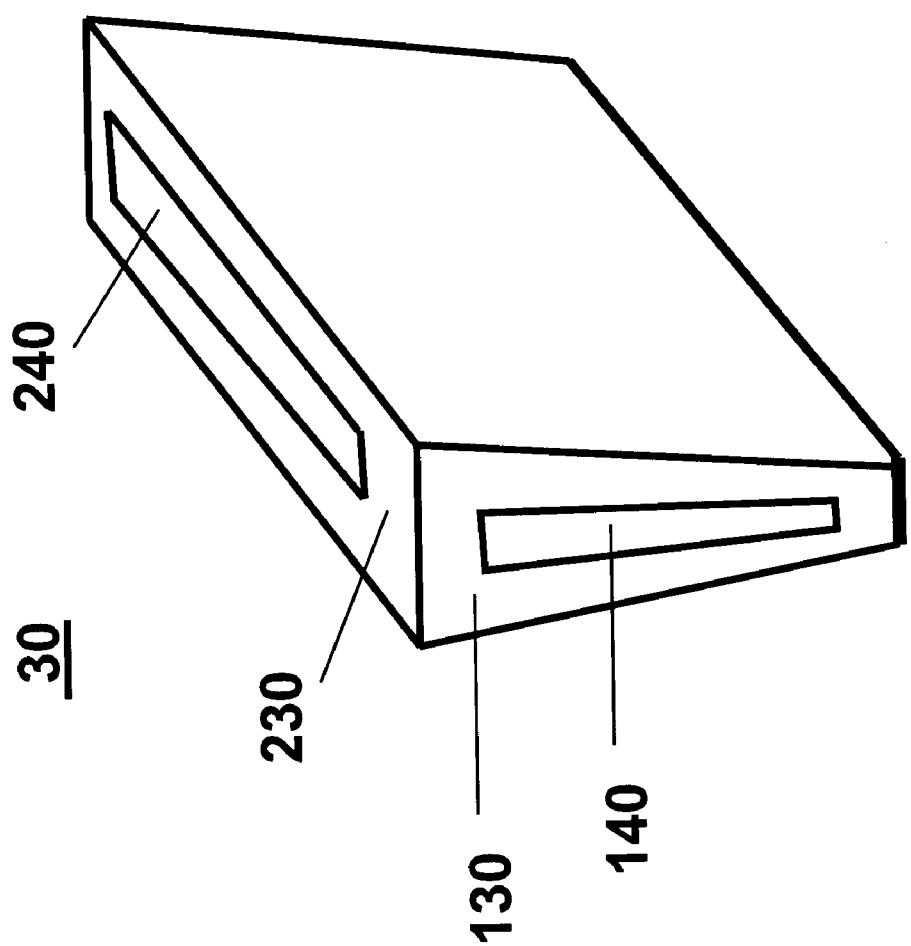
FIG. 3 is an enlarged view of a representative fin with embedded waveguide sensors forming part of the munition of FIGS. 1 and 2.

With further reference to FIG. 3, the waveguides 100 and 200 are embedded along various sides or faces of each or selected fins 30 of the munition 20. In FIG. 3, the waveguides are shown to be embedded in the fins of the munition. It is, however, appreciated by those skilled in the art that the waveguides may be embedded anywhere in an object, as long as it is not covered by materials that block the propagation of the emitted electromagnetic waves into the waveguide cavity. The waveguides may, for example for the case of munitions with fins, be along a radial face 130 of a fin 30 as the waveguide 100 with the correspondingly rectangular shaped frontal opening 140; or as an axial waveguide 200 that extends along a longitudinal face 230 of the fin 30 and is embedded within a correspondingly rectangular shaped frontal opening 240.

The waveguides 100 and 200 are generally similar in design and construction, and therefore only one representative antenna 100 will be described in more detail. The waveguide 100 is comprised of a waveguide cavity 115 and a receiver 111 secured to the base area of the waveguide cavity 115, as shown in FIG. 4.

Depending on the desired application, the waveguide cavity 115 may be filled with air or a solid or liquid dielectric. In addition to the features of the waveguide 100 that have been previously enumerated, the embedded nature of the waveguide cavity 115 enables a strong structure. The relatively simple design of the waveguide 100 also reduces the implementation costs.

Figure 4:
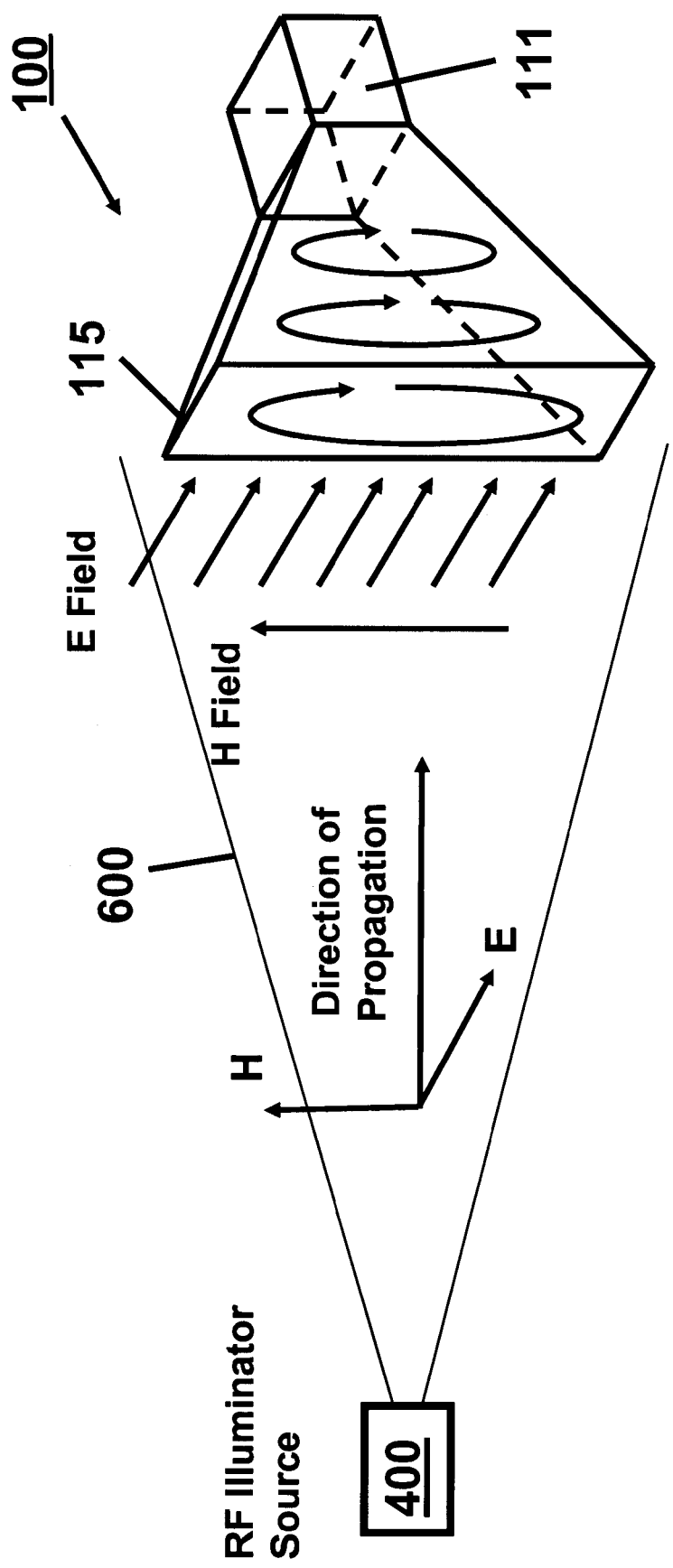
FIG. 4 is an enlarged view of a waveguide antenna of the type employed in the position and orientation measuring system of FIGS. 1 and 2 to be embedded in the fin of FIG. 3.

Referring now to FIGS. 1 and 4 there is shown a representation of the waveguide sensor 100 and its operation with respect to a polarized radio frequency illumination source (or illuminator) 400 affixed to a ground control station. An electromagnetic wave consists of orthogonal electric (E) and magnetic (H) fields which are orthogonal to each other. The electric field E and the magnetic field H of the illumination beam are mutually also orthogonal to each other and to the direction of propagation of the illumination beam. In line-of-site applications polarized microwave energy, the planes of E and H fields are fixed and stay unchanged in the direction of propagation. Thus, the illumination source establishes a coordinate system with known and fixed orientation, and a polarization with a known plane of reference as set by the illuminating source 400 of the ground station. The waveguide 100 reacts in a predictable manner to a polarized illumination beam. When three or more waveguides are distributed over the body of an object, and when the object is positioned at a known distance from the illuminating source, the amplitudes of the signals received by the waveguides can be used to determine the orientation of the object relative to the illuminating source. The requirement for the proper distribution of the waveguides over the body of the projectile is that at least three of the waveguides be neither parallel nor co-planar.

With more specific reference to FIGS. 1 and 4, the polarization mismatch between the illuminating source 400 and the sectoral horn waveguide sensor 100 is caused by a variation in the angle $\Theta_y$, FIG. 1. At a given positioning of the waveguide 100 relative to the illuminating source 400, the amplitude of the signal received by the sectoral horn waveguide 100 is also a function of rotations $\Theta_x$ and $\Theta_z$. For the waveguide 100 shown in FIGS. 1 and 4, the amplitude of the signal received is most sensitive to rotation $\Theta_x$ and least sensitive to rotation $\Theta_z$.

For a given waveguide and illuminating source, the relationships between the signal received at the waveguide as a function of the angles $\Theta_x$, $\Theta_y$ and $\Theta_z$ can be described as follows.

It is well known that for an arbitrary pair of transmit and receive antennas, such as the illuminating source 400 and the sectoral horn waveguide receiver antenna (sensor) 100, in free-space, the power received at the terminal of the receiving antenna is given by the so-called Friis transmission equation. For a given position of the waveguide sensor 100 relative to the illuminating source 400, this transmission equation can be written as $$P_r = P_t(\lambda/4\pi R)^2 G_{tot} G_g(\theta_X, \theta_Z) |\rho_t \cdot \rho_r|^2 \quad (1)$$

where $P_t$ and $P_r$ are the transmitted and received powers, respectively; $\lambda$ is the wavelength and R is the radial distance between the transmitter and receiver; $\square_t$ and $\square_r$ are the polarization unit vectors of the transmitter and receiver, respectively; $G_{tot}$ is the total gain corresponding to factors other than spatial orientation of the receiver relative to the illuminating source; and for a given waveguide cavity, $G_g$ is a function of the angular orientation of the waveguide indicated by the angles $\Theta_x$ and $\Theta_z$, and is related to the geometrical design of the waveguide cavity. For most practical antennas, the gains $G_{tot}$ and $G_g$ are complicated functions of antenna geometry, size, material properties and polarization. In general, these functions have to be theoretically evaluated or measured in an anechoic chamber. While closed-form analytical expressions for some canonically shaped antennas, for other antenna types one needs to resort to numerical techniques such as Method of Moments (MOM), Finite-Difference Time Domain Method (FDTD), or Finite Element Method (FEM), all of which are well known in the art.

Figure 10:
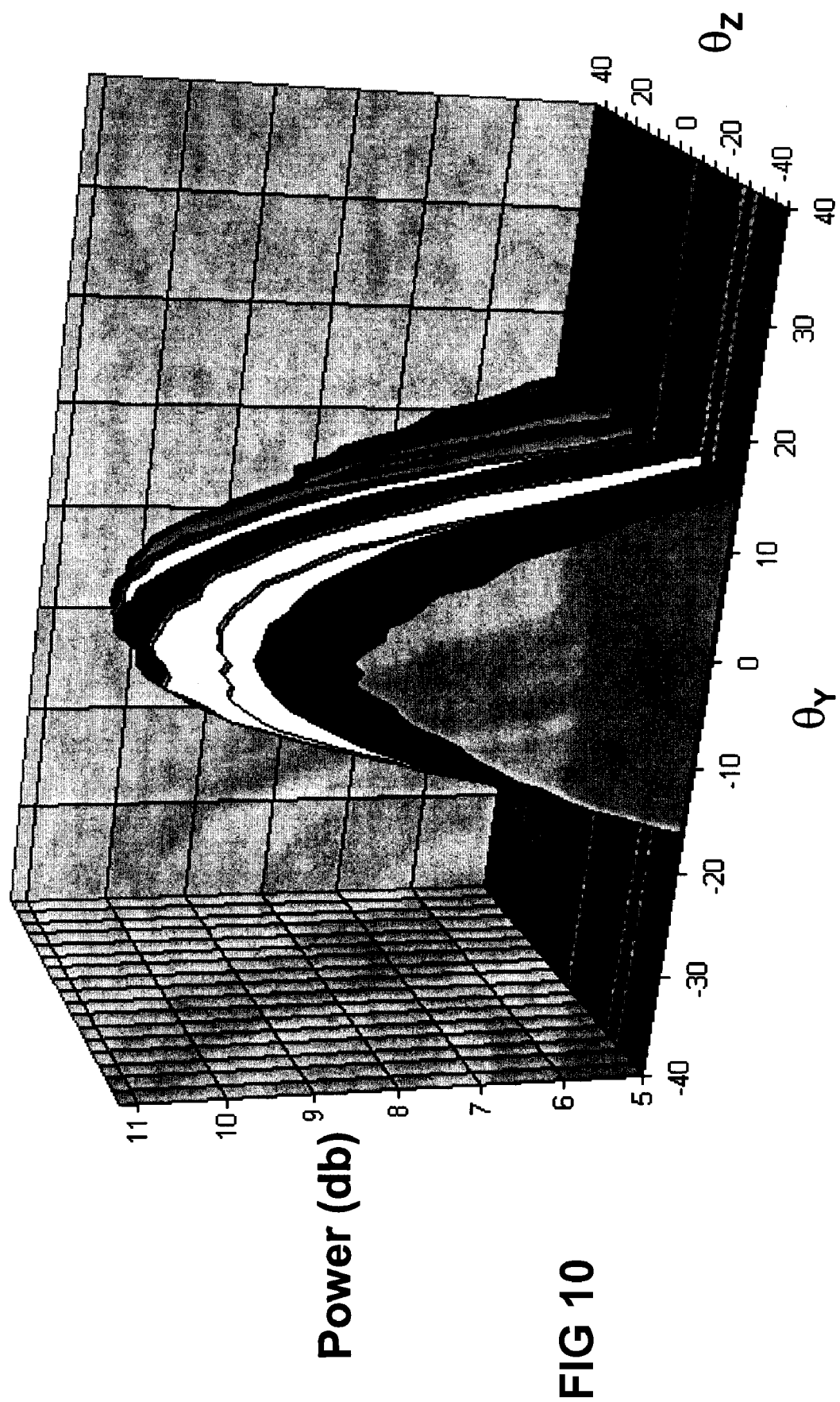
FIG. 10 represents data collected by a sectoral horn waveguide sensor from a polarized source positioned at a fixed distance. Experimental data relating the waveguide output to the angular orientations $\Theta_X$, $\Theta_Y$ and $\Theta_Z$, may be readily measured in an anechoic chamber.

For a given sectoral horn waveguide antenna 100, 200 positioned at a fixed distance from a polarized illuminating source, the waveguide output power as a function of the angular orientations described by angles $\Theta_x$, $\Theta_y$ and $\Theta_z$, may readily be measured in an anechoic chamber. For a given position and orientation measurement application, such measurements can be made for the full range of spatial rotation of the waveguide sensors 100, 200 and the information can be stored in tabular or graphical or any other appropriate form. This information serves as calibration data for each waveguide sensor 100, 200. Then when three or more waveguide sensors 100, 200 are embedded in an object 20, for a given position of the object 20 relative to the illuminating source 400, the power output of the waveguides 100, 200 can be matched with the calibration data to determine the spatial orientation of the object 20 relative to the illuminating source 400 which may be stationary or moving relative to the object 20. For a typical sectoral horn waveguide, the plot of the power output as a function of the angular rotations $T_Y$ and $\Theta_Z$, as measured in an anechoic chamber is shown in FIG. 10.

Figure 5:
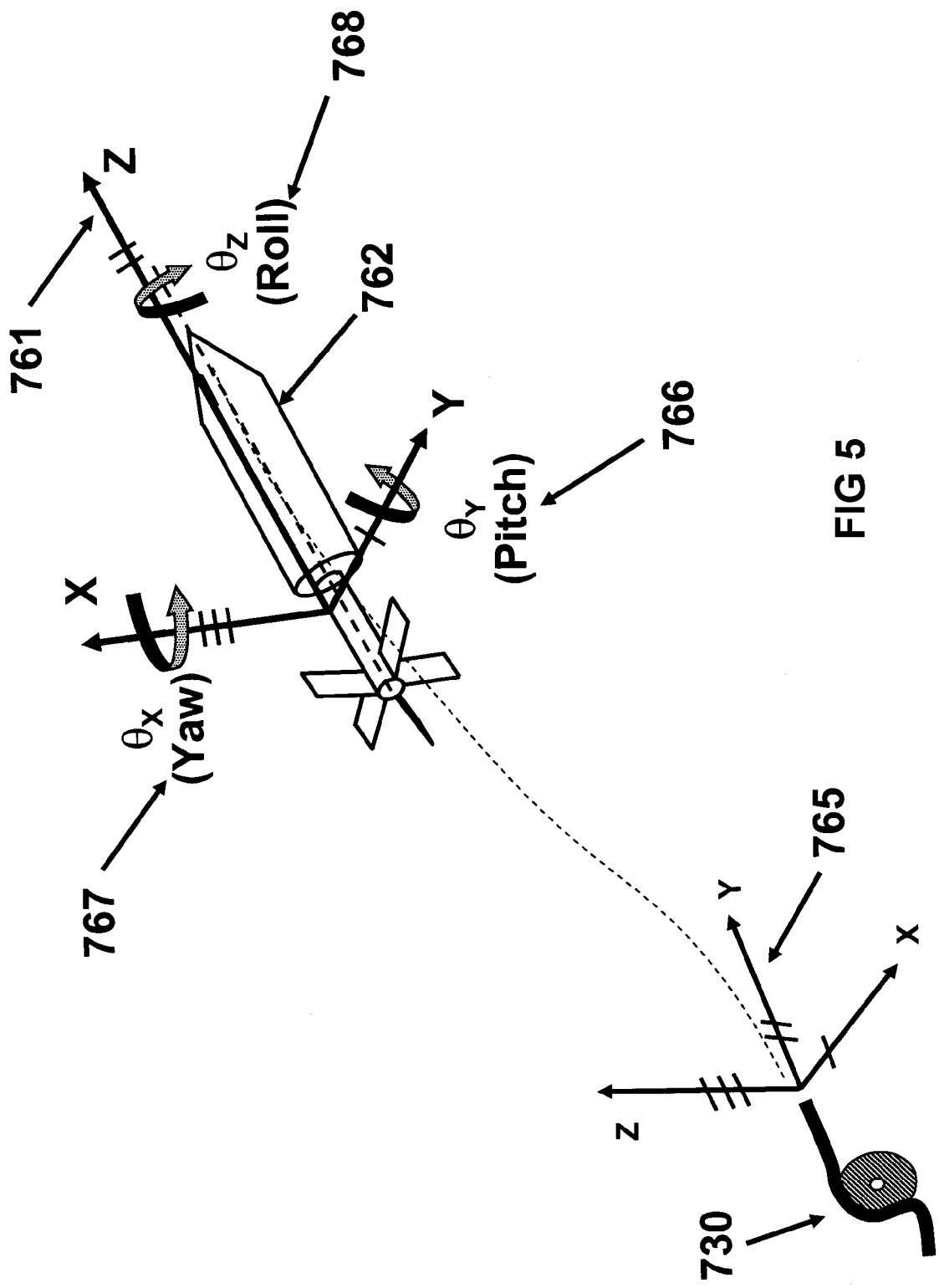
FIG. 5 is an illustration of the preferred coordinate systems that can be used to indicate the orientation of an object in flight (in this case a munition) relative to a fixed object (in this case a gun). In this illustration, the orientation is described by the pitch, yaw and roll, customarily used for munitions in flight.

FIG. 5 is an illustration of a coordinate system 761 fixed to the object in flight 762 (in this case a munition) for indicating its orientation relative to a fixed object (in this case the coordinate system 765 is fixed to the gun 730). In the coordinate system 761, the orientation of the object in flight (762) relative to the fixed coordinates 765 is described by the pitch (766), yaw (767) and roll (768), customarily used for objects, such as munitions, in flight.

Figure 6:
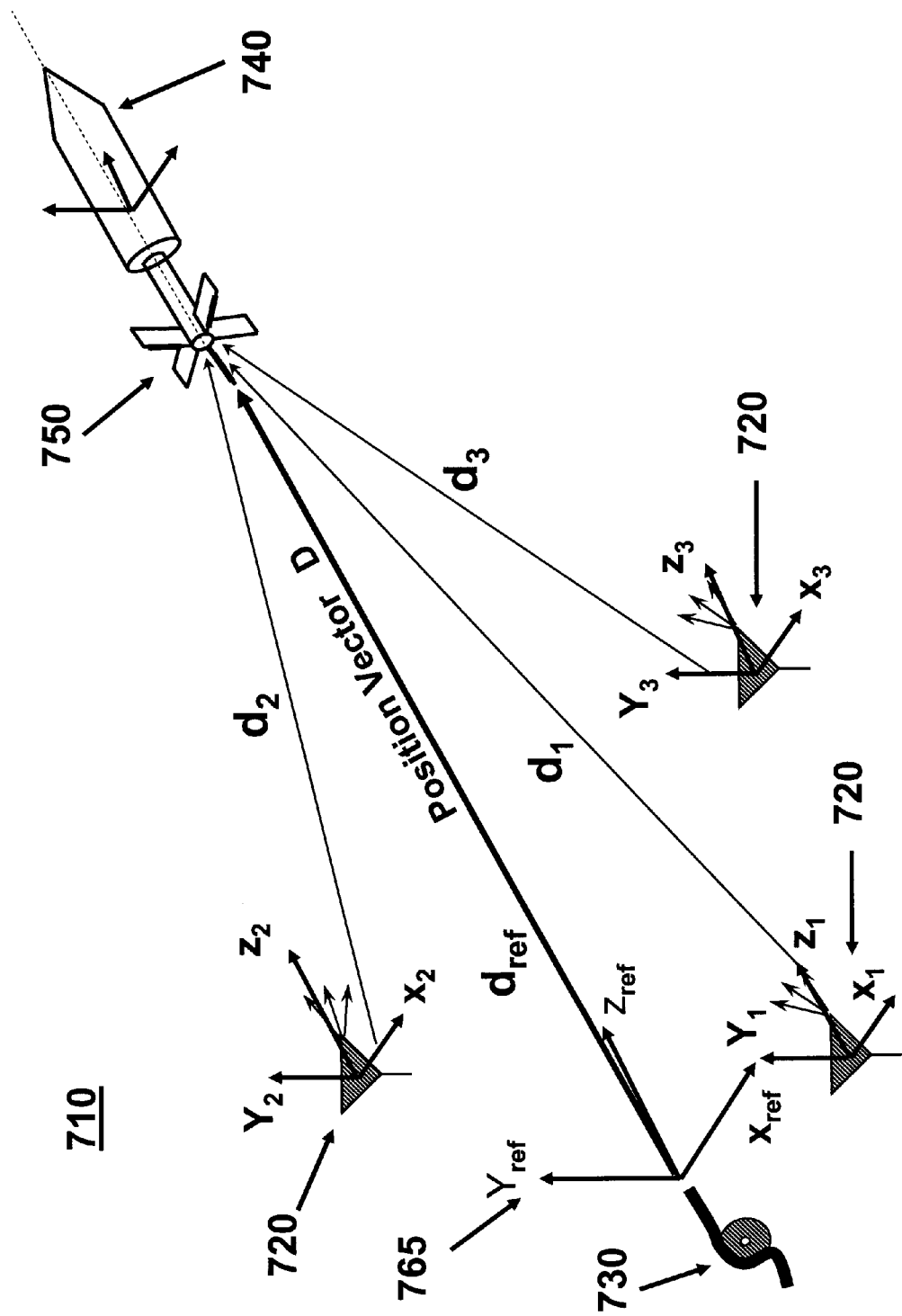
FIG. 6 is an illustration of an autonomous onboard absolute position and orientation measurement system of a first embodiment of the present invention, illustrating a plurality of polarized radio frequency sources, called illuminators, shown surrounding a first object (in this case the fixed gun emplacement), to provide temporally synchronized, pulsed or continuous polarized RF signals that illuminate a second object (in this case a munition in flight), for providing on-board information about the position and orientation of the second object (munition in flight) relative to the first object (the fixed gun)

FIG. 6 illustrates yet another embodiment 710 of the present invention, which relies on three or more of, preferably pulsed, radio frequency sources (illuminators) 720, providing temporally synchronized, excitations that illuminate a projectile such as a munition 740 (or any other object). A minimum of three illuminators 720 is required though a greater number increases the accuracy of the onboard position calculations. The positions of the illuminators 720 relative to the gun do not need to be known, as long the position of the projectile 740 is desired to be determined relative to the illuminators 720. If the position of the projectile 740 relative to the gun 730 is desired to be determined, then the position of the illuminators 720 relative to the gun 730 needs to be known.

Figure 7:
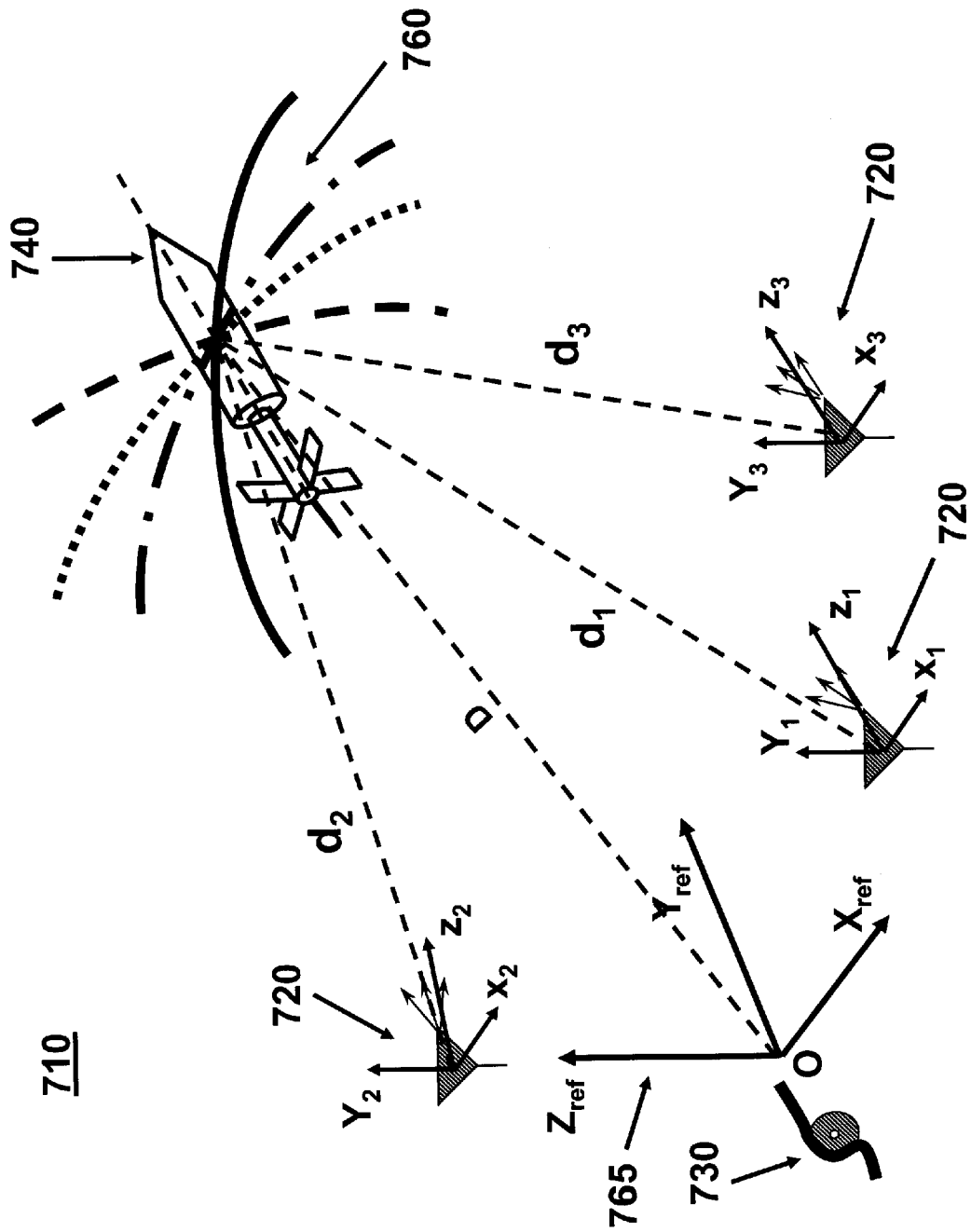
FIG. 7 is an illustration of the geometry and parameters of interest in the determination of the position of the second object (in this case a munition in flight) relative to a first object (in this case the fixed gun emplacement 730) in the embodiment of FIG. 6.

With reference to FIG. 7, the radio frequency pulses emanating from the illuminators 720 propagate to the projectile 740 in flight. The time taken for the signals to reach the projectile 740 from each illuminator 720 is then measured and used to calculate the distance between each of the illuminators 720 and the projectile 740, knowing the speed of propagation of electromagnetic signal to be equal to the speed of light.

Still with reference to FIG. 7, it can be understood that the distances $d_1$, $d_2$ and $d_3$, as measured from each of the illuminators 720 to the projectile 740 can be used to calculate the position of the projectile 740 relative to the illuminators 720 and to the gun 730. It is obvious to those skilled in the art that the position of an object in space relative to another object requires three independent distance measurement such as those of $d_1$, $d_2$ and $d_3$, or alternatively coordinates X, Y and Z in the Cartesian coordinate system $X_{ref}Y_{ref}Z_{ref}$, in which the position of the illuminators 720 and the gun 730 are known, or simply by a position vector D, which is a vector drawn from the origin O of a coordinate system of interest such as the $X_{ref}Y_{ref}Z_{ref}$ coordinate system to the position of the object of interest, in this case the projectile 740.

Succinctly, the algorithm for calculating the distance and the position vector is as follows: The distances, $d_1$, $d_2$ and $d_3$.

In another embodiment of the present invention, the position of the projectile 740 is measured using GPS and the orientation of the projectile 740 relative to a fixed or mobile object indicated by the Cartesian coordinate system $X_{ref}Y_{ref}Z_{ref}$ by the waveguides illuminated by the illuminator 840, FIG. 8. It should be apparent that other modifications might be made to the present referencing systems 10, 710 and 810 without departing from the spirit and scope of the invention. As an example, though the present invention has been described in relation to a projectile, it should be clear to one of ordinary skill in the art that the present invention may also be used to measure the position of an object relative to another fixed or mobile object; the orientation of an object relative to another fixed or mobile object; or the position and orientation of an object relative to another object. The measurements may be planar or spatial.

Figure 9:
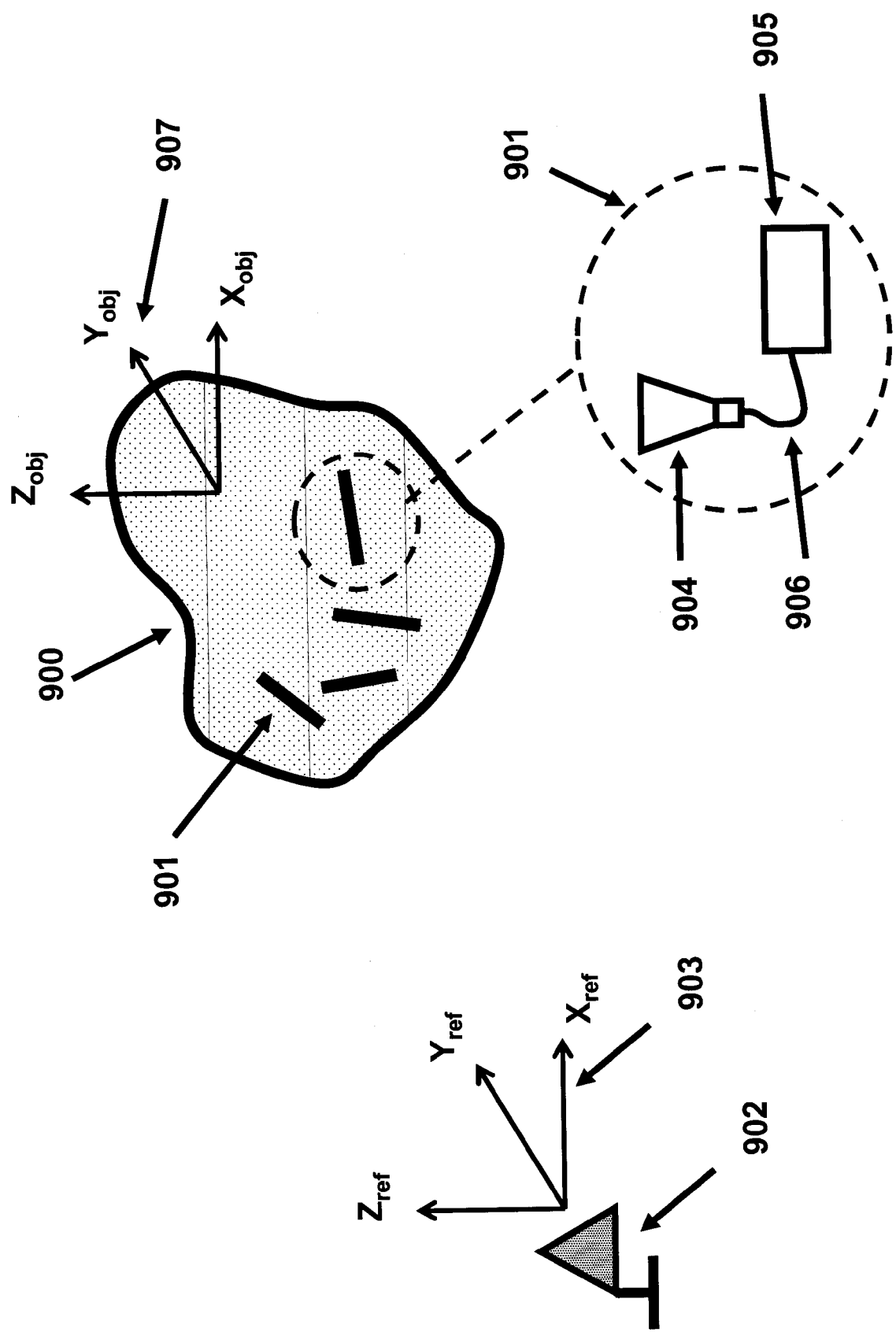
FIG. 9 shows the main components of the preferred embodiment of the present embedded position and orientation measuring system.

FIG. 9 shows the main components of an embodiment of the present embedded position and orientation measuring system. The schematic shows the object 900 with the embedded (attached) waveguide sensor units 901. The coordinated system $X_{obj}Y_{obj}Z_{obj}$ (907) is considered to be fixed to the object 900. Each waveguide sensor unit 901 consists of a waveguide 904, the output of which is sent to the data collection and processor unit 905 via a connection 906. Preferably, one central data collection and processing unit 906 serves all the waveguide sensor units 901, and is used to perform the aforementioned position and orientation calculations. Three or more polarized radio frequency illuminating sources 902 are positioned at different locations (only one source is shown in FIG. 9 for clarity). The illuminating sources 902 may be fixed or moving. A reference coordinate system $X_{ref}Y_{ref}Z_{ref}$(903) is considered to be fixed to the illuminating source. The three or more reference coordinate systems 903 define a referencing system relative to which the position and orientation of the object 900 is to be measured.

While there has been shown and described what is considered to be preferred embodiments of the invention, it will, of course, be understood that various modifications and changes in form or detail could readily be made without departing from the spirit of the invention. It is therefore intended that the invention be not limited to the exact forms described and illustrated, but should be constructed to cover all modifications that may fall within the scope of the appended claims.

What is claimed is:

1. A system for measuring a position of an object in flight relative to a reference location, the system comprising:
   three or more illuminating sources, each disposed in a predefined position, the three or more illuminating sources together emitting a plurality of distinct polarized radio frequency signals to provide temporally synchronized, pulsed radio frequency signals that illuminate the object;
   one or more sensors disposed on the object for receiving the plurality of distinct polarized radio frequency signals from each of the three or more illuminating sources in flight; and
   a processor for measuring a time for the plurality of distinct polarized radio frequency signals to propagate from each of the three or more illuminating sources to the one or more sensors and to determine a position of the object relative to the three or more illuminating sources based on the measured times.

2. The system of claim 1, wherein the receiver further calculates the distance of the object from the a reference point located at a known position relative to the three or more illuminating sources by determining an intersection point of spheres having the illuminating sources as centers, and the travel distances as radii, and by setting the distance of the intersection point of the spheres as the distance traveled by the object in flight relative to the reference location.

3. The system of claim 1, wherein the one or more sensors comprises three or more sensors each comprising a waveguide cavity, the processor measuring an angular orientation of the waveguide cavities relative to at least one of the three or more illuminating sources based on a level of the signal received at the waveguide cavities in flight.

4. The system of claim 3, wherein each of the three or more sensors are disposed on a surface which is not parallel to the other of the three or more sensors.

5. The system of claim 1, wherein the object comprises a munition.

6. The system of claim 5, wherein the reference location comprises a gun emplacement for firing the munition.

7. The system of claim 1, wherein the one or more sensors are embedded within the object.

8. A method for measuring a position of an object in flight relative to a reference location, the method comprising:
   disposing three or more illuminating sources in predefined positions;
   emitting a plurality of distinct polarized radio frequency signals from the three or more illuminating sources to provide temporally synchronized, pulsed radio frequency signals that illuminate the object;
   disposing one or more sensors on the object for receiving the plurality of distinct polarized radio frequency signals from each of the three or more illuminating sources in flight;
   measuring a time for the plurality of distinct polarized radio frequency signals to propagate from each of the three or more illuminating sources to the one or more sensors; and
   determining a position of the object relative to the three or more illuminating sources based on the measured times.

9. The method of claim 8, wherein the determining comprises calculating the distance of the object by determining an intersection point of spheres having the illuminating sources as centers, and the travel distances as radii, and by setting the distance of the intersection point of the spheres to a reference location as the distance traveled by the object in flight relative to the reference location.

10. The method of claim 8, wherein the one or more sensors comprises three or more waveguide cavities and the method further comprises:
   measuring a level of the signal received at each of the waveguide cavities from any one of the three or more illuminating sources; and
   determining an angular orientation of the object based on the measured levels of the signal received at the waveguide cavities in flight.

11. The method of claim 10, wherein each of the three or more sensors are disposed on a surface which is not parallel to the other of the three or more sensors.

12. The method of claim 8, wherein the object comprises a munition.

13. The method of claim 12, wherein the reference location comprises a gun emplacement for firing the munition.

14. The method of claim 8, wherein the one or more sensors are embedded within the object.

15. A munition comprising:
a casing having a nose and tail;
two or more fins disposed on the tail; and
at least a first of three or more sensors disposed on the casing and others on one or more fins, wherein the at least first of the sensors are embedded in the casing and one or more fins and receive a plurality of distinct polarized radio frequency signals from one or more illuminating sources for determining at least one of a position and orientation of the object relative to a reference location, and
at least one fin having a first sensor embedded in a longitudinal surface and a second sensor embedded in a radial surface.

16. A system for measuring an orientation of an object in flight relative to a reference coordinate system, the system comprising:
an illuminating source disposed in a predefined position, the illuminating source emitting a distinct polarized radio frequency signal to illuminate the object;
three or more waveguide cavities disposed on the object for receiving the distinct polarized radio frequency signal from the illuminating source in flight; and
a processor for measuring a level of signal received by each of the three or more the waveguide cavities from the illuminating source and to determine an orientation of the object relative to the illuminating source based on the levels of measured signals.

17. The system of claim 16, wherein the object is a munition and the illuminating source is located at a gun emplacement for firing the munition.

18. A method for measuring an orientation of an object in flight relative to a reference coordinate system, the method comprising:
disposing an illuminating source in a predefined position;
emitting a distinct polarized radio frequency signal from the illuminating source to illuminate the object;
disposing three or more waveguide cavities on the object for receiving the distinct polarized radio frequency signal from the illuminating source in flight;
measuring a level of signal received by each of the three or more waveguide cavities; and
determining an orientation of the object relative to the illuminating source based on the measured level of received signals.

* * * * *